United States Patent [19]
Fry et al.

[11] Patent Number: 5,539,914
[45] Date of Patent: Jul. 23, 1996

[54] METHOD AND SYSTEM FOR PREPROCESSING DATA BLOCK HEADERS DURING ACCESS OF DATA IN A DATA STORAGE SYSTEM

[75] Inventors: Scott M. Fry; Habib M. Torab, both of Tucson, Ariz.

[73] Assignee: International Business Machines Corporation, Armonk, N.Y.

[21] Appl. No.: 77,164

[22] Filed: Jun. 14, 1993

[51] Int. Cl.$^6$ ............................. G06F 13/00; G06F 13/20
[52] U.S. Cl. ................. 395/827; 395/427; 395/840; 364/948; 364/952.6; 364/260.1; 364/254.3; 370/94.1
[58] Field of Search ............................ 395/275, 500, 395/325, 827, 427, 840; 370/94.1

[56] References Cited

U.S. PATENT DOCUMENTS

| | | | |
|---|---|---|---|
| 3,772,657 | 11/1973 | Marsalka et al. | 340/172 |
| 3,806,886 | 4/1974 | McClellan et al. | 340/172 |
| 4,327,408 | 4/1982 | Frissell et al. | 364/200 |
| 4,433,415 | 2/1984 | Kojima | 371/37 |
| 4,472,750 | 9/1984 | Klumpp et al. | 360/78 |
| 4,584,617 | 4/1986 | Libove et al. | 360/49 |
| 4,586,094 | 4/1986 | Chambors et al. | 360/77 |
| 4,601,586 | 7/1986 | Bahr et al. | 370/94 |
| 4,774,654 | 9/1988 | Pomerene et al. | 364/200 |
| 4,835,678 | 5/1989 | Kofuji | 364/200 |
| 4,882,642 | 11/1989 | Tayler et al. | 360/78 |
| 5,129,074 | 7/1992 | Kikuchi et al. | 395/425 |
| 5,197,145 | 3/1993 | Kitamura et al. | 395/425 |
| 5,247,647 | 9/1993 | Brown et al. | 395/425 |
| 5,321,817 | 6/1994 | Feinstein | 395/325 |
| 5,335,328 | 8/1994 | Dunn et al. | 395/275 |

*Primary Examiner*—Thomas C. Lee
*Assistant Examiner*—Rehana Perveen Krick
*Attorney, Agent, or Firm*—Manny W. Schecter; Andrew J. Dillon

[57] ABSTRACT

A method and system are disclosed for efficiently reading and processing multiple data blocks stored in a removable data storage medium within a data storage system, wherein each data block includes a header portion containing selected parameters necessary to identify and process an associated data block, and a data portion. Each data block is accessed within the removable data storage medium utilizing track logic circuitry and then coupled to a data block buffer for temporary storage. A header processing logic circuit is interposed between the track logic circuitry and the data block buffer and is utilized to initiate processing of only the header portion of each data block prior to storage of the data block within the data block buffer. After completion of processing of the header portion of a data block and completion of storage of that data block within the data block buffer, the data block is efficiently processed utilizing selected parameters contained within the header portion. In this manner, data blocks may be efficiently transferred, processed or coupled to an error recovery procedure from the data block buffer without the delay associated with processing each header portion of a data block after storage of that data block within the data block buffer.

3 Claims, 3 Drawing Sheets

5,539,914

METHOD AND SYSTEM FOR PREPROCESSING DATA BLOCK HEADERS DURING ACCESS OF DATA IN A DATA STORAGE SYSTEM

BACKGROUND OF THE INVENTION

1. Technical Field

The present invention relates in general to improved data storage systems and in particular to a method and system for enhancing the efficiency of data block processing within a data storage system. Still more particularly the present invention relates to an improved method and system for initiating processing of a header portion of each data block prior to transfer of the associated data block into a data block buffer.

2. Description of the Related Art

Modern data processing systems often use digital signal recording devices attached to host processors to record records as addressable units within magnetic tape storage systems.

Examples of systems which may be utilized to record records within a magnetic tape storage system are disclosed within Milligan et al., U.S. Pat. No. 4,393,445; *Milligan* et al., U.S. Pat. No. 4,435,762; Videki II, U.S. Pat. No. 4,471,457; Cole et al., U.S. Pat. No. 4,603,382; Bauer et al., U.S. Pat. No. 4,423,480; and Fry et al., U.S. Pat. No. 4,403,286. Each of the aforementioned patents discloses a magnetic tape storage system which may be advantageously employed in carrying out the method and system of the present invention.

The records stored within such a magnetic tape storage system are typically recorded as addressable units which comprise a block of signals recorded on magnetic tape in a manner set forth within the above-referenced patents. Each such data block on a tape is separated from an adjacent data block by a so-called inter-block gap (IBG) which may comprise an erased portion to the tape, a tone or other special symbol denoting the presence of an inter-block gap.

In early data storage systems, such inter-block gaps may be quite long; however, as system development has resulted in higher and higher data capacity and native data rate capability within storage subsystems, the inter-block gap has been substantially decreased in duration. As a result, the decisions and processing of data blocks which are read from tape in a data storage system must be accomplished within this increasingly smaller gap between consecutive data blocks, resulting in much greater demands on the processing hardware.

Each data block within such a data storage system typically includes both a data portion and a header portion which contains all information needed to identify and process a particular block of data. Normally, this information may be utilized to determine the "type" of data block, whether or not the current data block is a copy of a previously read data block, whether or not any sequencing errors exist between the current data block and those data blocks previously read which are associated with the current data block and whether or not additional data blocks are to be read in association with the current data block. As will be appreciated, the overhead of processing required to determine these parameters and process each data block becomes a more difficult problem to resolve.

Thus, it should be apparent that a need exists for a method and system for more efficiently processing data blocks within a data storage system despite the decreased amount of time available for such processing within an inter-block gap.

SUMMARY OF THE INVENTION

It is therefore one object of the present invention to provide an improved data storage system.

It is another object of the present invention to provide an improved method and system for enhancing the efficiency of data block processing within a data storage system.

It is yet another object of the present invention to provide an improved method and system for initiating processing of a header portion of each data block within a data storage system prior to transfer of the associated data block into a data block buffer.

The foregoing objects are achieved as is now described. A method and system are disclosed for efficiently reading and processing multiple data blocks stored in a removable data storage medium within a data storage system, wherein each data block includes a header portion containing selected parameters necessary to identify and process an associated data block, and a data portion. Each data block is accessed within the removable data storage medium utilizing track logic circuitry and then coupled to a data block buffer for temporary storage. A header processing logic circuit is interposed between the track logic circuitry and the data block buffer and is utilized to initiate processing of only the header portion of each data block prior to storage of the data block within the data block buffer. After completion of processing of the header portion of a data block and completion of storage of that data block within the data block buffer, the data block is efficiently processed utilizing selected parameters contained within the header portion. In this manner, data blocks may be efficiently transferred, processed or coupled to an error recovery procedure from the data block buffer without the delay associated with processing each header portion of a data block after storage of that data block within the data block buffer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
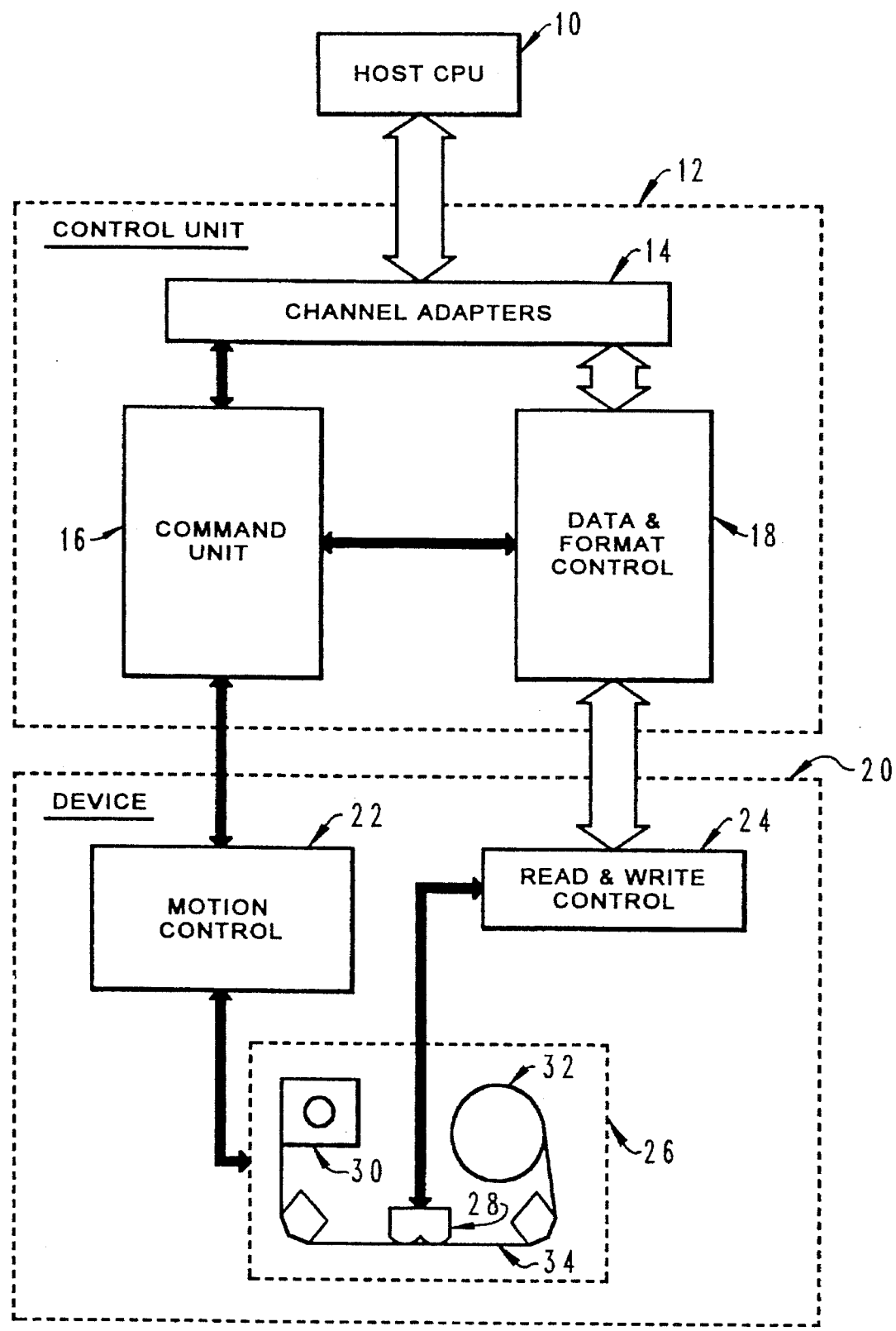
FIG. 1 is a schematic representation of a data storage system which may be utilized with the method and system of the present invention.

With reference now to the figures and in particular with reference to FIG. 1, there is depicted a schematic representation of a data storage system which may be utilized with the method and system of the present invention. As illustrated, a data processing system having a host central processing unit 10 coupled to one or more storage systems. Such storage systems may be implemented utilizing a tape storage system such as the International Business Machines Model No. 3480, 3490, or 3490E Magnetic Tape System. For ease of illustration, a single host CPU and tape storage system are depicted within FIG. 1. As illustrated, host central processing unit 10 is coupled to control unit 12 and at least one magnetic tape recording for playback device 20, and controls such devices accordingly.

As illustrated, control unit 12 includes a command unit 16 which is coupled, via channel adapters 14, to host central processing unit 10, in order to accept commands from host central processing unit 10 to control the mechanical operation of storage device 20. Command unit 16 also preferably controls the flow of data between channel adapters 14 and tape 34, via data and format control 18 and read and write control 24.

As illustrated within FIG. 1, tape storage device 20 preferably includes motion control 22, for controlling the handling of magnetic tape media, and read and write control 24, which includes both read and write circuits for operating on a magnetic transducing head 28 within tape path 26. Tape path 26 preferably includes a tape cartridge 30 having a tape supply reel therein and a tape take-up reel 32. Well known motors and control systems may be utilized for transporting magnetic tape 34 past head 28 for writing data to and reading data from tape 34.

Figure 2:
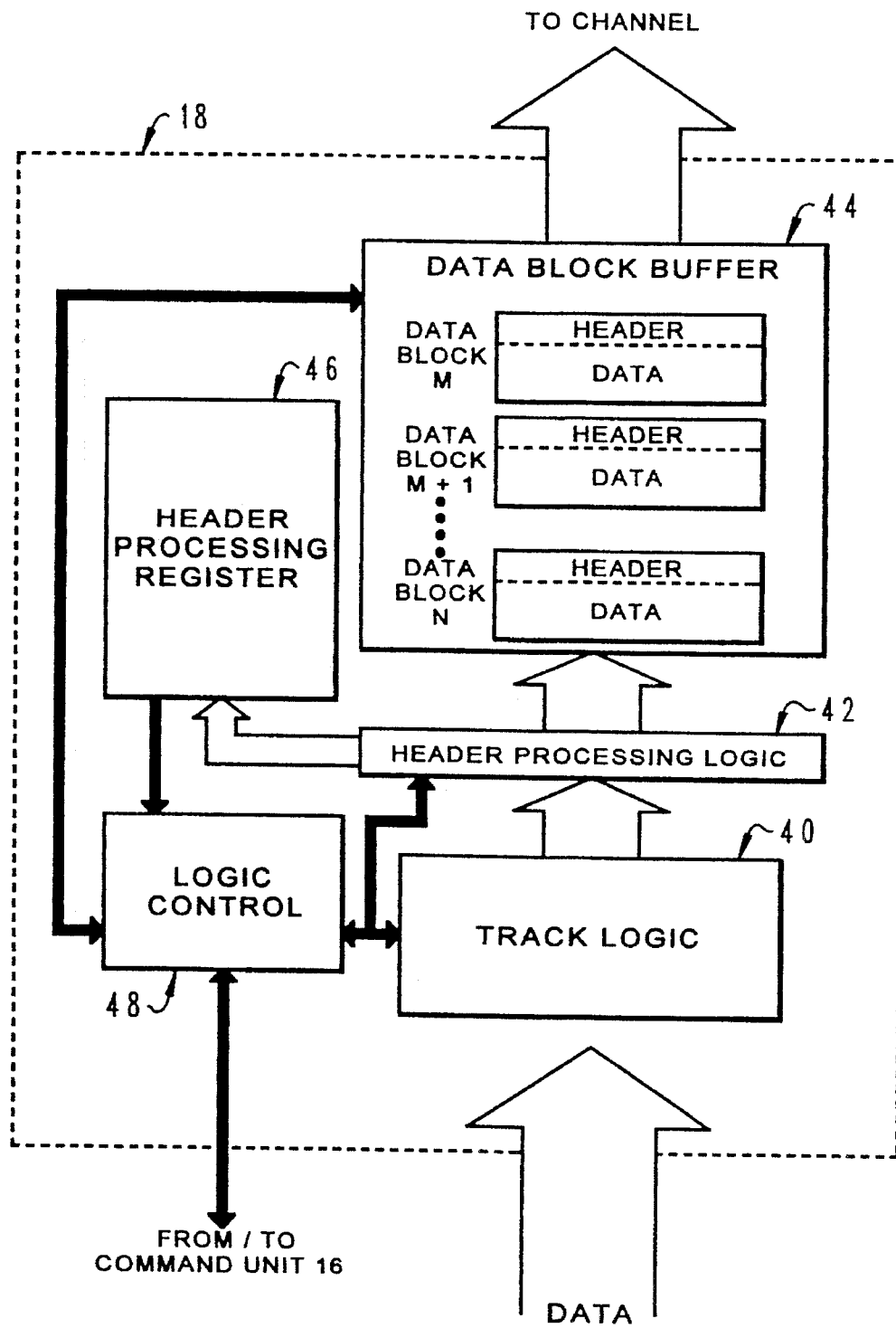
FIG. 2 is a high level block diagram of the data and format control circuitry of the data storage system of FIG. 1.

Referring now to FIG. 2, there is depicted a high level block diagram of the data and format control circuit 18 of the data storage system of FIG. 1. As illustrated, data from head 28 is coupled, via read and write control 24 (see FIG. 1) to track logic 40. Track logic 40 is utilized to characterize the data read by head 28 and, to couple data read from tape 34 to host CPU 10, in a manner which will be explained in greater detail herein. As is typical in such data storage system, the initiation of the retrieval of data from tape 34 is typically preceded by the detection of an acquisition character or acquisition "burst" which is designed to allow individual track clocks to simultaneously acquire bit synchronization for the data on each track. This acquisition character or burst is typically a repeating pattern of bytes which, when modulated and adjusted, produces a unique repeating pattern of bits which is recognized within data and format control circuit 18 as an acquisition character. Thereafter, a sequence of multiple records or data blocks is received by track logic 40 from tape 34. Each of these records or data blocks typically includes one or more synchronization characters which are utilized to assist in the receiving of these records.

In accordance with the method and system of the present invention, each data block is then coupled from track logic 40 to data block buffer 44 for transfer to host CPU 10, via channel adapters 14. As illustrated within data block buffer 44, each data block typically includes a header portion which includes those parameters necessary to transfer and process a particular data block, as well as a data portion. This header information typically includes an identification of the type of data block associated therewith, and an indication of whether or not additional associated data blocks must be read after reading the current data block. Additionally, this information may be utilized to determine whether or not the current data block is a copy of a data block which has been previously read or, information concerning the current data block may be compared to previous data blocks to determine whether or not any sequencing errors exist between the current data block and a previous related data block.

In accordance with an important feature of the present invention, as each data block is being transferred from track logic 40 to data block buffer 44, the header portion of each data block is detected by header processing logic 42. Header processing logic 42 then couples the header portion of each data block to header processing register 46 where, under the control of logic control 48, the processing of that header information is initiated prior to completion of transfer of the data block to data block buffer 44. This processing of header information in parallel with the transfer of the remainder of a data block greatly enhances the efficiency of data block processing and accommodates smaller and smaller interblock gaps between adjacent data blocks. By providing an independent resource for reading and processing the header portion from each data block, and for storing a data block within a buffer, both operations may occur concurrently. Thus, data blocks stored within data block buffer 44 may be identified with respect to relationships with preceding and succeeding data blocks or, with regard to whether or not sequencing errors exist prior to initiating transfer of the data block to channel adapters 14. This function is accomplished under the control of logic control 48 which, as illustrated in FIG. 2, controls the operation of track logic 40, header processing logic 42, data block buffer 44 and header processing register 46 in response to commands received from command unit 16 (see FIG. 1).

As those skilled in the art will appreciate upon reference to FIG. 2, by interposing header processing logic 42 between track logic 40 and data block buffer 44, the header portion of each data block may be received and processing of that header portion may be initiated prior to completion of transfer of the data block into data block buffer 44. Since data blocks may comprise a large segment of data, this preprocessing of the header portion of each data block greatly enhances the efficiency of the transfer and manipulation of data blocks from data block buffer 44.

Figure 3:
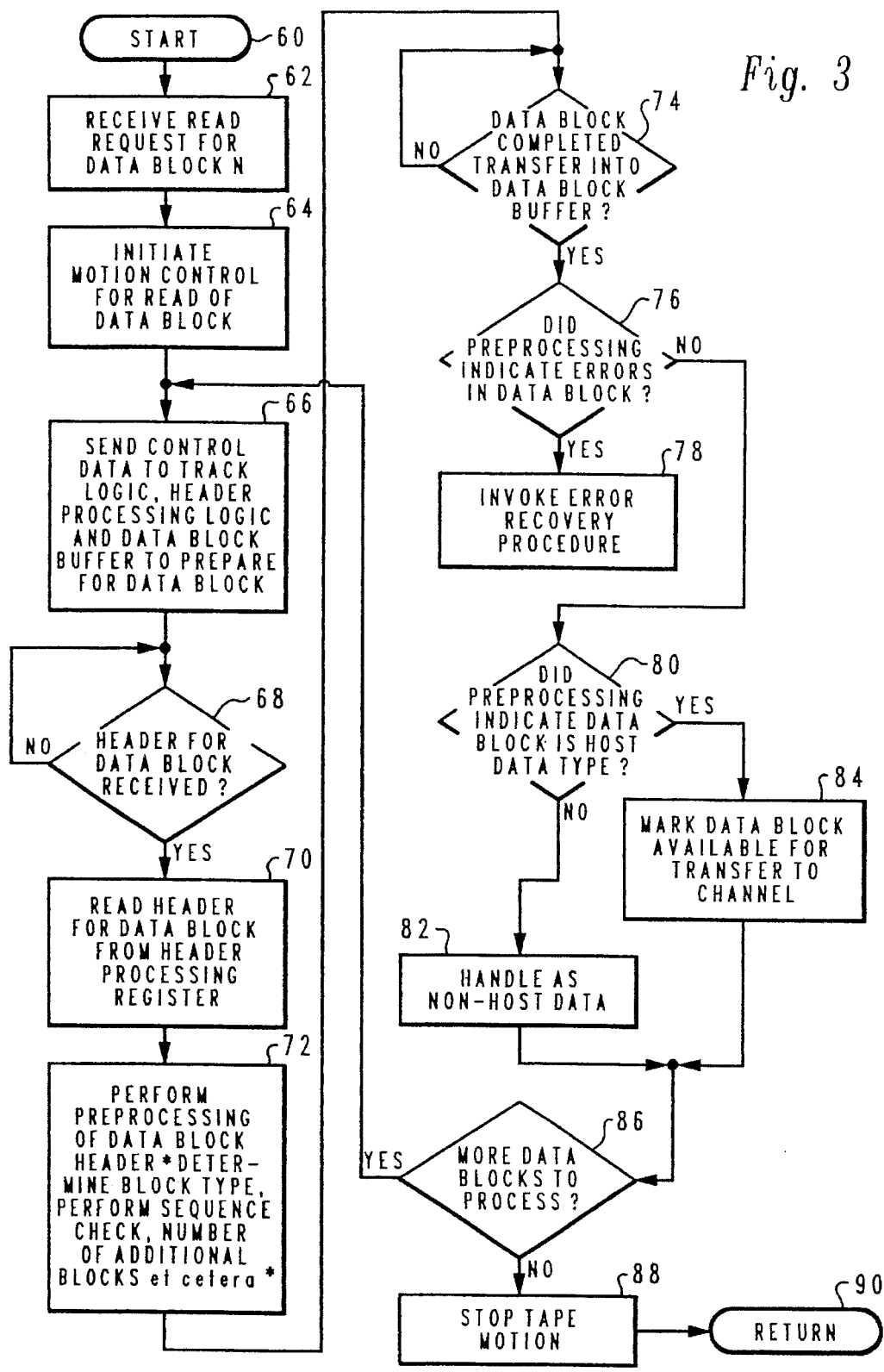
FIG. 3 is a high level logic flowchart illustrating a method for implementing the present invention.

Finally, with reference to FIG. 3, there is depicted a high level logic flowchart which illustrates the process by which the header portion of each data block may be preprocessed to greatly enhance the efficiency of the data processing system. As illustrated, this process begins at block 60. Thereafter, the process passes to block 62, which illustrates a receipt of a read request for a particular data block within the data storage system. Next, the process passes to block 64, which initiates the necessary motion control commands which are required to read the selected data block. Thereafter, the process passes to block 66.

Block 66 illustrates the transmission of the control data necessary to operate track logic 40, header processing logic 42 and data block buffer 44 to prepare for receipt of the selected data block. Block 68 next illustrates a determination of whether or not the header portion for the particular data block has been received at header processing logic 42. If not, the process merely iterates until such time as the header portion of the data block has been received. However, once the header portion of the received data block is detected at header processing logic 42, the process passes to block 70.

Block 70 illustrates the reading of the header portion for the received data block from the header processing register 46 for initiation of the processing thereof. Next, as depicted at block 72, the preprocessing of the data block header portion is accomplished. As described above, this process may be utilized to determine the particular block type. For example, certain data blocks are stored within the removable storage media of the data processing system for utilization by the data storage system while other data blocks are stored containing data for the host CPU. Thus, it is important to determine whether or not a particular data block is to be transferred to the host CPU or utilized within the data storage system. Additionally, sequence number checks may be performed by comparing information regarding the current data block with the information associated with previous data blocks to determine whether or not any sequencing errors have occurred in the transfer of multiple data blocks. Additionally, the header portion of a data block may be utilized to determine whether or not additional related data blocks exist which must be read following the processing of the current data block in order to complete the process. Similarly, the header portion of each data block may be utilized to determine whether or not the block currently being read is a copy of a previously read data block.

After initiating preprocessing of the header portion of each data block, the process passes to block 74. Block 74 illustrates a determination of whether or not the transfer of the data block has been completed into data block buffer 44. If not, the process merely iterates until such time as data block transfer has been complete. Alternately, after data block transfer into data block buffer 44 has been complete, the process passes to block 76.

Block 76 illustrates a determination of whether or not the preprocessing of the header portion of the data block indicates any errors existed within the data block. If errors exist, the process passes to block 78 which illustrates the automatic invocation of an error recovery procedure. Alternately, in the event no errors were indicated within the data block during preprocessing, the process passes to block 80. Block 80 illustrates a determination of whether or not the preprocessing of the header portion of the data block indicated whether or not the data block is a host data block or a data storage system data block. In the event the current data block is not a host data block type, the process passes to block 82. Block 82 illustrates the handling of the data block as non-host data. Those skilled in the art will appreciate that such data blocks may include file marks, end of data marks or other special types of physical blocks which may be utilized by the data storage system.

Still referring to block 80, in the event preprocessing of the header portion of a data block indicated that the data block is a host type data block, the process passes to block 84. Block 84 illustrates the marking of that data block as available for transfer to the channel from data block buffer 44 and thereafter, or after handling a non-host type data block, the process passes to block 86. Block 86 illustrates a determination of whether or not additional data blocks are needed to be processed and if so, the process returns, in an iterative fashion, to block 66 to repeat the process just described. Alternately, in the event no additional data blocks are needed to be processed, the process passes to block 88, which illustrates the stopping of tape motion. Thereafter, the process passes to block 90 and returns.

Upon reference to the foregoing, those skilled in the art will appreciate that the method and system described herein greatly facilitates the efficiency of the transfer and processing of data blocks within a data storage subsystem by intercepting and initiating processing of the header portion of each data block prior to completion of the storing of that data block within a data block buffer for transfer to the host CPU. Since the header portion of a data block is typically quite small compared with total block size, the considerable gap which has previously existed between the transfer of a data block into a buffer and the time required to process the header portion is substantially eliminated.

While the invention has been particularly shown and described with reference to a preferred embodiment, it will be understood by those skilled in the art that various changes in form and detail may be made therein without departing from the spirit and scope of the invention.

We claim:

1. A data storage system for efficiently reading and processing multiple data blocks stored therein within a removable storage medium, each of said multiple data blocks including a header portion containing selected parameters necessary to identify and process an associated data block and a data portion, including sequence information and a relation indication indicating whether or not a subsequent data block is related to a current data block said data storage system comprising:

a transducing head;

means for moving said removable data storage medium relative to said transducing head;

means for controlling said transducing head to read data from said removable storage medium;

a data block buffer for temporarily storing a data block for future processing;

track logic means for receiving said data block from said removable data storage medium and for coupling said data block to said data block buffer;

header processing logic interposed between said track logic means and said data block buffer for initiating processing of only said header portion of said data block, to determine said selected parameters, prior to storage of said data block within said data block buffer;

logic control means coupled to said header processing logic and said data block buffer for processing said data block after storage thereof within said data block buffer utilizing said selected parameters and for automatically initiating receipt of a subsequent data block in response to said relation indication; and error recovery means coupled to said header processing logic for automatically invoking an error recovery procedure in response to an indication of sequence error during processing of said header portion.

2. The data storage system according to claim 1, wherein said logic control means includes means for marking a data block as available for transfer from said data block buffer.

3. A method for efficiently reading and processing multiple data blocks stored within a removable storage medium in a data storage system, each of said multiple data blocks including a header portion containing selected parameters necessary to identify and process an associated data block and a data portion, including sequence information and a relation indication indicating whether or not a subsequent data block is related to a current data block, said method comprising the steps of:

accessing a data block within said removable storage medium and coupling said data block to a buffer;

initiating processing of only said header portion of said data block, to determine said selected parameters, prior to storage within said buffer;

automatically invoking an error recovery procedure in response to an indication of sequence error during processing of said header portion;

automatically initiating receipt of a subsequent data block from said removable storage medium in response to said relation indication; and processing said data block after storage thereof within said buffer utilizing said selected parameters.

\* \* \* \* \*